CONTROLLABLE ELECTRIC RESISTANCE DEVICE

Filed Oct. 21, 1950 3 Sheets-Sheet 1

INVENTORS,
Eberhard Hermann Georg Spenke,
Frank Wenzel Georg Rose
Erich Gerhard Rudolf Waldkötter
BY C. M. Avery ATTY'

INVENTORS:
Eberhard Hermann Georg Spenke,
Frank Wenzel Georg Rose,
Erich Gerhard Rudolf Waldkötter
BY C. M. Avery
ATTY'

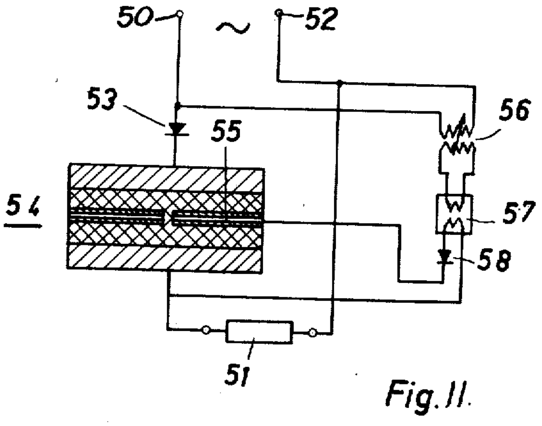
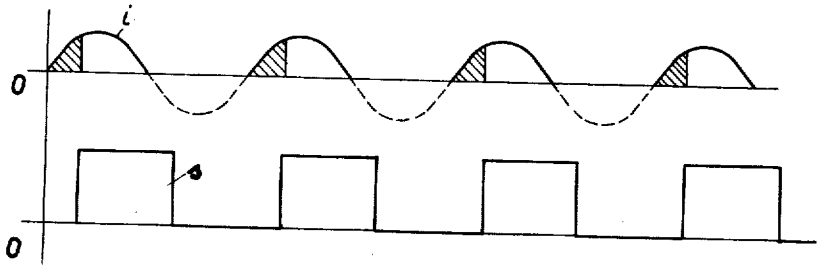
Fig.12.
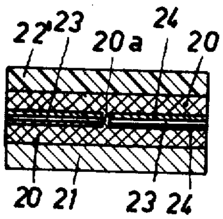
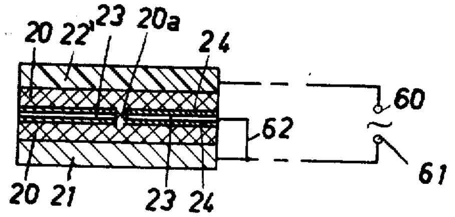
Fig.13. Fig.14.
INVENTORS:
Ebrhard Hermann Georg Spenke
Frank Wenzel Georg Rose
Erich Gerhard Rudolf Waldkötter
BY C. M. Avery
ATTY Patented Aug. 11, 1953

2,648,805

UNITED STATES PATENT OFFICE 2,648,805

CONTROLLABLE ELECTRIC RESISTANCE DEVICE

Eberhard Hermann Georg Spenke, Frank Wenzel Georg Rose, and Erich Gerhard Rudolf Waldkötter, Pretzfeld, Germany, assignors to Siemens-Schuckertwerke, Aktiengesellschaft, Berlin-Siemensstadt, Germany, a corporation of Germany Application October 21, 1950, Serial No. 191,360
In Germany May 30, 1949

18 Claims. (Cl. 317—235)

Our invention relates to controllable electric resistors and the like devices for controlling electric circuits.

It is an object of our invention to devise a resistance device of a static type that, though not requiring an electronic vacuum or gaseous discharge, is controllable by the direct application of a control voltage and operates virtually free of inertia, thus being applicable for a large variety of purposes in much the same way as electronic amplifier or control tubes and particularly wherever an electric current path is to be controlled or regulated by minute control energy.

Another object of our invention is to provide a bodily electric resistor of controllable resistance and to obviate the need for providing it with mechanically movable or otherwise mechanically actuated or thermally responsive resistance control members.

It is also an object of the invention to make the resistive behaviour of electric resistors of the solid-material type adaptable to different selectively available resistance characteristics in one or both directions of current flow, a subsidiary object being to secure a characteristic of the saturation type configuration.

An object of the invention is further to devise rectifier units of the dry or junction type that can be controlled by application of control voltage to provide a controllable rectified output.

Another object of the invention is to provide industrially suitable methods of making the novel resistance and rectifier units.

In order to achieve these and the more specific objects apparent from the following, our invention takes advantage of the barrier-layer effect known from semiconductors such as selenium. Such semiconductors and various other substances form a barrier layer where they are in contact engagement with a suitable metal. The barrier layers offer a high resistance to the passage of electric current and are dependent, as regards occurrence and effectiveness, upon the magnitude of the impressed voltage. This behaviour is utilized, for instance, in the so-called dry rectifiers in which a thin semiconductive layer is contacted at one side by a barrier-free contact element and at the other side by a barrier-forming contact element, the so-called barrier electrode. When a voltage of a given direction is applied between the two contact elements, a barrier layer is produced which practically blocks the current passage in this direction or maintains any remaining current flow within very small magnitudes. It has now been observed that the thickness of the barrier layer thus produced is dependent upon the magnitude of the impressed voltage. With an increasing voltage, the layer of high resistance expands more deeply into the semiconductive or other resistance material susceptible to the barrier layer effect. The portion of the resistance material not occupied by the barrier layer is consequently diminished by the thickness of the barrier layer.

The just-mentioned phenomenon is utilized by the invention in the following manner. According to the invention, a body of resistance material susceptible to barrier-layer formation is provided with a barrier electrode arranged to form in the resistance body a diaphragm-shaped barrier layer across the current path to be controlled, the dimensions of the diaphragm opening being dependent upon the impressed voltage.

The invention involves a variety of possibilities for the design of such resistance devices. According to one feature of the invention, the resistor proper is a semiconductive body joined with two terminals or connector electrodes, while the barrier diaphragm disposed in the current path of this resistor body is formed by a barrier electrode located at a place where the current path is strongly constricted. The constriction of the current flow lines can be secured by a corresponding shaping of the semiconductive body, preferably by giving the semiconductive body a spot of very small dimensions in one or both directions transverse to the flow direction of the current to be controlled, and locating the controlling barrier electrode at or near this spot and substantially around the constricted current path.

The term "connector electrode" in this specification as well as in the claims refers to the barrier-free contact member or terminal which engages the semiconductive or other resistance body. The terms "barrier electrode" and "diaphragm electrode" refer to electrode members which contact the barrier susceptible resistance body and form together therewith a barrier layer due to impressed voltage.

The foregoing and other features of the invention will be apparent from the following description of the embodiments exemplified by the drawing, in which:

Fig. 11 is the circuit diagram of a controllable rectifying apparatus according to the invention;

Fig. 12 is a coordinate diagram representing typical wave shapes of the current flow and of the control voltage as occurring in rectifying apparatus according to Fig. 9;

Fig. 13 is a sectional view of another embodiment of a controllable rectifying device according to the invention; and Fig. 14 is a similar view of an embodiment of a controllable rectifying apparatus with a saturation characteristic.

Figure 1:
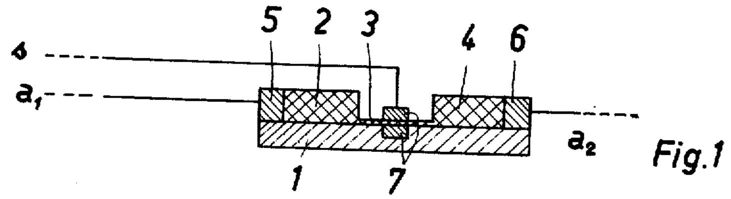
Figs. 1 and 2 show respective resistance devices according to the invention by part sectional front views.

The resistor according to Fig. 1 has an insulating base plate 1 on which a barrier-susceptible or semiconductive resistance body is mounted. This body is composed of three parts 2, 3 and 4 and is intimately contacted by two connector electrodes 5 and 6 also mounted on the insulating plate 1. The intermediate resistor portion 3 has much smaller dimensions than the bordering portions 2 and 4 and is intimately contacted by a barrier electrode 7 which serves to provide a controllable barrier diaphragm. The connecting leads (in Figs. 1 through 4) are denoted by $a_1$ and $a_2$, and the control lead is denoted $s$. As apparent from Fig. 1, the middle part 3 of the resistance body is very thin, although its width in the direction across the plane of illustration may be large. Generally, however, the width of portion 3 in at least one of the directions transverse to the current path (i. e. penpendicular to the plane of illustration) is very small.

For operating the resistance device, the two connector electrodes 5 and 6 are series connected by the respective leads $a_1$ and $a_2$ into the circuit to be controlled. The control or regulation of the resistance is effected by means of a control voltage impressed between the barrier electrode 7 and one of the connector electrodes. The electrode 7 contacts the semiconductor 3 in the manner known from the technique of dry rectifiers so that the application of control voltage results in the formation of a barrier layer which extends from the barrier electrode 7 into the body 3. The electrode 7 fully covers the top and bottom sides of body 3, or the electrode fully encloses this body so that the barrier layer, if growing from electrode 7 fully into the body 3, would not leave any free spot for the passage of current. Consequently, the effect is as if a diaphragm of controlled opening area is placed into the resistive current path between the two connector electrodes 5 and 6. The opening width of the barrier diaphragm depends, as explained, upon the magnitude of the impressed control voltage, the thickness of the barrier layer being larger with larger control voltages, so that the available cross section of current flow and hence the effective resistance are varied in the rhythm of the control voltage.

To form the resistor proper, i. e. the semiconductive body in the embodiment of Fig. 1, of three portions has the purpose to constrict or bunch the lines of current flow at the spot of the diaphragm. This design is based on the consideration that the thickness of the resulting barrier layer as such is very small. It is advisable, therefore, to adapt the transverse dimensions of the resistor body at the diaphragm spot to the order of magnitude of the resulting barrier layer thickness. In other words, it is essential to give the dimension of the current path in the direction of the "diaphragm movement" at the place of the diaphragm electrode a magnitude of only a few multiples, for instance, twice or three times the extent of the barrier layer thickness occurring in the particular resistor substance used, although the dimensions of the constricted resistor portion may be smaller if possible. The term "diaphragm movement" as used in the foregoing and hereafter is intended to refer to the opening and closing directions, i. e. to the growth and decline of the barrier layer under the effect of the control voltage.

Figure 2:
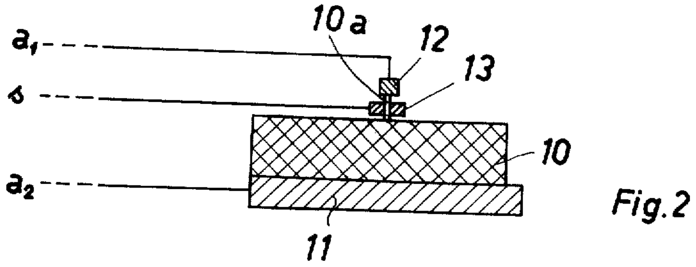

In Fig. 2 the resistor proper, consisting of a semiconductor, is denoted by 10. Joined with this resistor is a plate-shaped connector electrode 11. The resistance body 10 has a filament-shaped extension 10*a* to which is joined a second connector electrode 12 and a barrier electrode 13. The barrier electrode 13 completely surrounds the filament extension 10*a*. For reasons mentioned in the following, the barrier electrode 13 is insulated from the main resistance body 10 by being somewhat spaced therefrom.

The functioning of the resistance device according to Fig. 2 is largely similar to that of Fig. 1. The special shape of the semiconductive assembly 10, 10*a* serves the purpose to provide a spot of a strong constriction of the current path lines within the semiconductive body. This is easily achieved by the provision of the filament extension 10*a*. It may be mentioned that for the sake of lucid illustration the representation in the drawing is not correct according to measure. In particular, the electrode 13 is shown thicker than actually necessary. In reality, this electrode may be very thin. This applies even more to the filament shaped extension 10*a*. The filament may be produced, for instance, by immersing a glass rod or the like into a molten bath of selenium or another semiconductive or otherwise suitable material and then removing the rod, thus drawing a filament from the bath. By inspecting the filament under a microscope or by other suitable methods, those parts of the filaments are selected which have the desired thickness. The selected pieces of filaments are than used as the filament-shaped extensions 10*a*. The barrier electrode 13 can be joined with the filament by immersing the filament, or the selected filament section of limited length, in a molten metal or by depositing in vacuum a metal coating on the filament.

Departing from the embodiment of Fig. 2, it is also possible to build up the entire controllable resistance device with the aid of a filament-shaped resistance body of suitable material. This can be done by mounting a barrier electrode in the above-mentioned manner on a limited length of the filament-shaped piece of material and attaching the connector electrodes to the same piece of filament material, for instance, by clamping the filament piece at both ends in metal holders which then form a barrier-free contact and serve as the connector electrodes.

Figure 3:
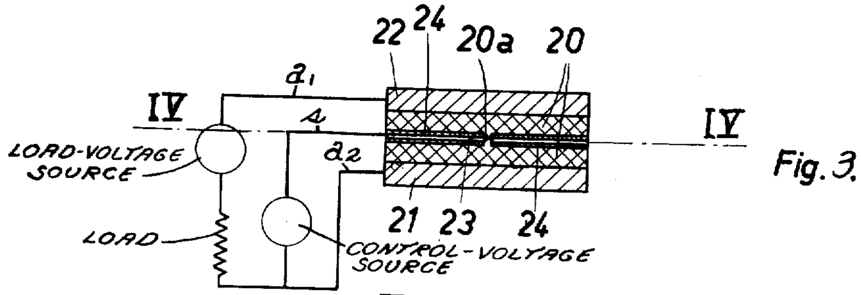
Figs. 3 and 4 show another resistance device according to the invention in a sectional front view and a sectional top view, the respective sectional planes being indicated by the line III—III in Fig. 4 and the line IV—IV in Fig. 3.
Figure 4:
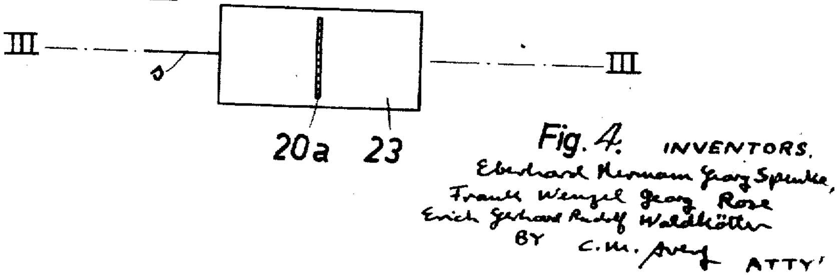

In the device according to Figs. 3 and 4, the resistance body proper is denoted by 20, and the spot of strong constriction of the current path lines in the body is denoted by **20*a*. The two appertaining connector electrodes 21 and 22 consist of plates which are joined with the resistance body. The barrier electrode 23 is foil-shaped. It is insulated over most of its surface areas from the adjoining material of the resistance body 20, this being schematically indicated by insulating layers 24. In this manner a narrow and thin conductive gap is produced at the spot 20*a*** of the resistance body.

The operation of this device is similar to that of the embodiments previously described. The barrier layer diaphragm is formed by the barrier electrode 23 and the constricted current path at **20*a*. The thickness of the gap or current path is dimensioned according to the foregoing explanations so that it amounts to only a few multiples or less of the thickness of the occurring barrier layer. The electric insulation of the barrier electrode 23 from the resistance body 20 by layers 24**, consisting, for instance, of varnish coats or paper inserts, has the purpose to keep the control energy as small as possible. If no insulation were effective, there would be spots which during the occurrence of control voltages would not contribute to the control effect, i. e. to the formation of the barrier layer diaphragm but would rather divert current from the control path. It is, therefore, necessary to avoid such current-diverting spots. For this reason it is also advisable to keep the barrier electrode as small as possible in the direction transverse to the "diaphragm movement" in order to minimize the diversion of control energy.

The control or diaphragm electrode, therefore, is preferably formed by a very thin metal foil. Since, as mentioned, it is infeasible to accurately illustrate all dimensional proportions in the drawing, it will be understood that as regards foil thickness the drawing is not intended to be exactly to scale.

The spot **20*a* of constricted transverse dimension within the resistance body 20 proper can be formed, for instance, by the following method of manufacture. First only the lower portion of the resistance body 20 is joined with the electrode 21. Then the barrier electrode foil is mounted after a fine cut has been made in that electrode with a fine blade or the like tool. Thereafter the semiconductive or other material used for the resistance body 20 is pressed into the slot formed by the cut. For this purpose the resistance material is previously converted to its liquid or plastic state. After filling the cut with resistance material, the top layer of the resistance body 20 is joined with the bottom portion, and finally the connector electrode 22** is mounted on top of the assembly.

Instead of providing only a single gap in the barrier electrode 23, as shown in Figs. 3 and 4, it is also possible to provide it with several passageways of rounded or slot-shaped cross section. It is then also preferable to electrically insulate the entire barrier electrode against the resistance body proper with the exception of the inner walls of the perforations that form the current passageways.

As regards the materials best suitable for the electrodes and relative to other matters of manufacture, the known techniques of manufacturing dry rectifiers, for instance, selenium rectifiers, are applicable. It may be mentioned, however, that when using selenium for the resistance body, the barrier electrode may consist of a tin-cadmium alloy, for instance, while the connector electrode may consist, for instance, of nickel, nickel-coated iron plates, or nickel-selenide layers.

Resistance devices according to the invention can be modified and improved in various ways. According to an improvement feature, the control voltage of the diaphragm electrode is correlated to the voltage of the current path to be controlled, for instance, by a short-circuit connection or by means of other electric coupling members, so as to modify or adapt the resistive behaviour to desired requirements, for instance, for securing a saturation type characteristic. Such a saturation characteristic is desirable for various application purposes. For instance, in telephone systems for automatic selector operation, it is often essential to design certain electric circuits in such a manner that they permit the flow of direct currents only up to a predetermined limit value, while offering a high resistance to superimposed small alternating voltages. Such and similar purposes require a resistance device whose resistance characteristic is approximately as typified by the voltage resistance diagram of Fig. 5. According to Fig. 5, the characterized resistance element has the particularity that the current intensity in the element does not increase in proportion to the voltage impressed across the element. In other words, the resistance of the element is not constant but increases with increasing voltage.

Figure 6:
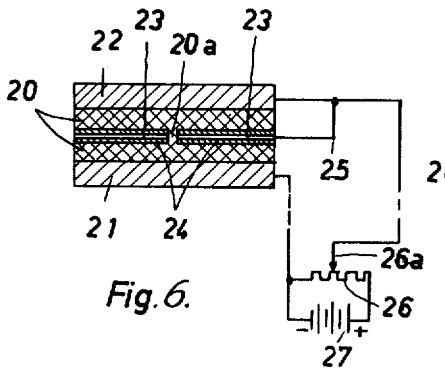
Fig. 6 shows an embodiment of a resistance device according to the invention with appertaining circuit means for adjusting the resistance characteristic.
Figure 5:
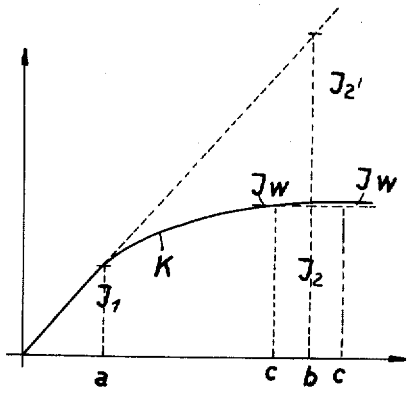
Fig. 5 is a coordinate diagram showing a typical resistance-voltage characteristic of devices according to the invention with reference to the embodiments illustrated in Figs. 6, 7, 9 and 10.

The embodiment shown in Fig. 6 secures a saturation characteristic of the type shown in Fig. 5 with the aid of very simple circuit means. As far as the resistance device proper is concerned, the embodiment of Fig. 6 is in accordance with the above-described device of Figs. 3 and 4, the reference numbers used in Fig. 6 being identical with those of Figs. 3 and 4 for similar respective elements. In Fig. 6, the connector electrode 22 is electrically joined with the diaphragm electrode 23 by a short-circuit connection 25. The two connector electrodes 21 and 22 are attached across an adjusted portion of a potentiometer rheostat 26 energized from a suitable source of direct current represented by a battery 27. The short-circuit connection 25 between electrodes 22 and 23 can be made during the manufacture of the resistance device. This can be done, for instance, by placing the connector electrode 22 at its bottom side into direct metallic contact with the top side of the diaphragm electrode 23 so that the two electrodes are practically integrated to a single element. Instead, the connector electrode 22 can be omitted and the barrier electrode 23, then preferably not insulated at its top side, also assumes the function of the connector electrode 22.

The operation of the device according to Fig. 6 is as follows: If the tap **26*a* of the potentiometer rheostat 26 is positioned near the negative terminal of source 27, then the diaphragm electrode 23 and the connector electrode 22 have only a slight positive potential difference relative to the connector electrode 21**, for instance, only the small potential *a* indicated in the diagram of Fig. 5. It will be understood from the preceding explanations that the barrier diaphragm is then relatively wide open. Consequently, the resistance effective between the electrodes 21 and 22 is small, and a direct current of the magnitude $J_1$ (Fig. 5) will flow through the resistance body. If the tap 26a is displaced toward the positive source terminal, a correspondingly higher potential is applied to diaphragm electrode 23 and connector electrode 22 relative to the connector electrode 21, for instance, the potential indicated at *b* in Fig. 5. Now the opening of the barrier diaphragm is greatly reduced and the effective resistance between the connector electrodes 21 and 22 correspondingly increased. If this effect had not taken place, then the current due to the increased positive potential would assume the magnitude of $J_2'$ according to the linear characteristic of common resistors. Due to the action of the barrier-layer diaphragm, however, the current has increased only to the value $J_2$. The embodiment of Fig. 6, therefore, represents a resistance element having a typical saturation characteristic as exemplified by the curve K in Fig. 5.

At high direct-current loads, a device according to Fig. 6 offers a high resistance value to superimposed small alternating-current voltages, as will be elucidated presently. In Fig. 5 is plotted a voltage interval *c—c* extending toward both sides from the axis determined by the higher potential *b*. This interval is supposed to represent the positive and negative variations of an alternating voltage wave that may be superimposed on the direct-current potential applied to the resistance device. Since the current flow in the resistance body follows the characteristic curve K, the superimposed alternating current effective at the unidirectional potential *b* has the magnitude $T_w$. It will be recognized that the current variations due to the superimposed alternating voltage occur along the flat portion of the characteristic K. Consequently, the superimposed alternating voltages have only a slight effect, the alternating component of the resultant direct current remaining extremely small. In other words, within the portion of the characteristic here of interest, the alternating-current resistance of the device according to Fig. 6 is very high.

Figure 7:
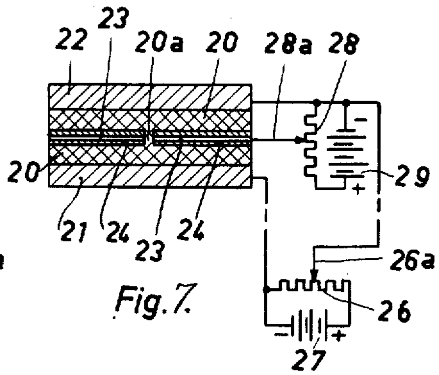
Fig. 7 shows a similar resistance device with modified circuit means.
Figure 8:
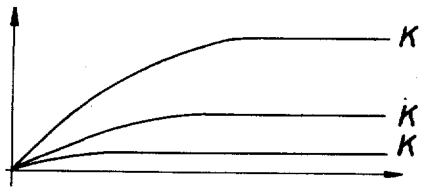
Fig. 8 represents a family of resistance-voltage characteristics with reference to the embodiment of Fig. 7.

The embodiment according to Fig. 7 differs from that of Fig. 6 only in that the above-mentioned short-circuit connection 25 is replaced by a potentiometer rheostat 28 with a battery 29 or other source of constant direct-current voltage. The adjustable potentiometer tap is denoted by 28a. This device permits adjusting the potential of the diaphragm electrode 23 relative to the connector electrode 22 to any desired value within the available limits. As a result, the device can be adjusted to different saturation characteristics simply by correspondingly positioning the tap 28a of rheostat 28. In this manner, for instance, the device may be given any of the different characteristics typified in Fig. 8 by curves $K_1$, $K_2$ and $K_3$. In other respects, the operation of the device shown in Fig. 7 is similar to that of Fig. 6.

It should be understood that the potentiometer rheostats 26 are shown in Figs. 6 and 7 mainly for the purpose of lucid illustration. As a rule, the necessary voltages need not be taken from a potentiometer rheostat. More often, the resistance device according to the invention is connected in given circuits so that the potentials or voltage drops occurring in these circuits and effective at the resistance device take the place of the potentiometric arrangements exemplified on the drawing.

Devices according to Figs. 6 and 7 secure the desired modification or adaptation of the resistance characteristic, for instance, for obtaining a saturation type behaviour, only in one given direction of current flow. Hence, such devices have a valve effect when impressed by alternating voltage and are also applicable for rectifying purposes.

However, resistance devices according to the invention can also be designed to secure the above-explained effect on the resistance characteristic in both directions of current flow. This is of interest for applications where the direct current flowing through the resistance device does not always have the same direction and is also of advantage for alternating-current uses of the resistance devices.

Figure 9:
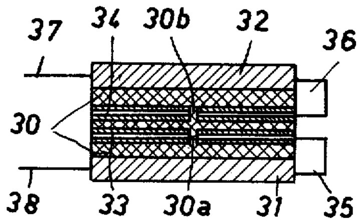
Figs. 9 and 10 show sectional views of two respective modifications of devices according to the invention having a resistance characteristic controllable in both directions of current flow.

An example of a device active to modify the resistance characteristic in both directions of current flow is shown in Fig. 9. A semiconductive layer 30 consisting, for instance, of selenium is joined with two connector electrodes 31 and 32. Two barrier electrodes 33 and 34 are disposed within the semi-conductive layer 30 and have respective constricted current paths at 30a and 30b. Both barrier electrodes are electrically insulated at their respective upper and lower surfaces from the material of the semiconductive layer 30 except at the places of the controlled and constricted paths 30a and 30b. The insulation consists, for instance, of a coat of varnish or a layer of paper. The barrier electrode 33 is connected with the connector electrode 31 by a short-circuit connection 35. Accordingly, the barrier electrode 34 is connected with the connector electrode 32 by a short-circuit connection 36. It will be recognized that the two barrier electrodes and their respective gaps are arranged in series relation to each other relative to the flow of current passing between the connector electrodes.

When a voltage of one polarity is applied across the leads 37 and 38 of the device, the barrier electrode 33 with gap 38 is effective to produce the above-mentioned modification of the resistance characteristic, while a voltage of the opposite polarity will cause the other barrier electrode 33 to have a similar effect. Consequently, the resistance characteristic of a device according to Fig. 9 differs from the ordinary linear characteristics in both directions of current flow.

The effect obtained with devices according to Fig. 9 can also be secured by connecting two resistance units according to Fig. 6 and/or Fig. 7 in series with each other and with mutually opposed polarities of the respective connector electrodes that are electrically joined with the appertaining barrier electrode.

Figure 10:
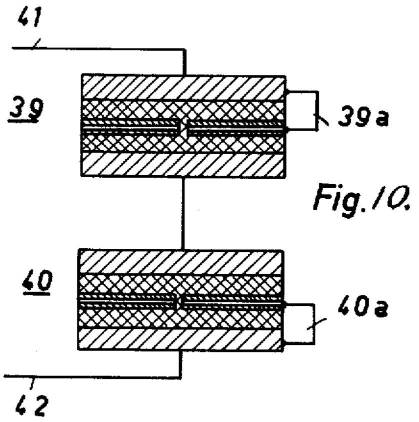

In Fig. 10, showing such a series opposed connection of two resistance units, the two units are denoted by 39 and 40. The appertaining short-circuit connections corresponding to the device of Fig. 6 are denoted by 39a and 40a. The terminal leads 41 and 42 are to be connected in the circuit to be controlled or regulated by the series connected two units.

If in a circuit according to Fig. 10 the two series connected resistance units are adjusted for respectively different characteristics, which can be done, for instance, by using one or two units according to Fig. 7, then the arrangement has not only different respective characteristics for the two directions of current flow, but has also a rectifying operation.

Apparatus according to the invention can also be designed to operate as controllable rectifying devices. To this end, according to another feature of the invention, a device having a barrier diaphragm as explained in the foregoing is series connected with a dry or junction type rectifier.

The just-mentioned feature is embodied in the apparatus shown in Fig. 11. The circuit to be controlled has terminals 50 and 52 across which an alternating voltage is impressed. The circuit extends from terminal 50 through a dry rectifier 53, a controllable resistance device 54 and through the load 51 to terminal 52. The resistance unit 54 is designed in accordance with the principles explained previously and has a diaphragm electrode 55 essentially as explained in conjunction with Figs. 3 and 4. The control voltage for the diaphragm electrode 55 is taken from the circuit to be controlled through an adjustable phase shifter 56 and a transformer 57. Transformer 57 has the characteristic needed to provide a secondary output voltage of rectangular wave shape. The secondary circuit of transformer 57 is connected across the barrier electrode 55 and one of the connector electrodes of the resistance unit 54 through a valve 58 which suppresses the negative pulses or half waves supplied from the transformer. Consequently, the pulses of control voltage impressed on the controllable resistance unit 54 correspond essentially to the curve *s* shown in the voltage-time diagram of Fig. 12. Fig. 12 also shows a curve *i* which exemplifies the current pulses in the load 51 assuming that the barrier diaphragm is always open. The phase position of the voltage curve *s* relative to the current curve *i* can be adjusted with the aid of the phase shifter 56. The phase shifter 56 and/or the transformer 57 transform the voltage taken from the load circuit to be controlled so as to impress on the resistance unit a control voltage of the desired magnitude.

The operation of the device according to Fig. 11 can be explained as follows. If the resistance unit 54 in the circuit to be controlled were omitted, the positive half waves according to curve *i* in Fig. 11 would substantially fully pass through the load as is the case in conventional non-controllable rectifying apparatus. Due to the presence of the controlled resistance unit 54, however, part of each positive current half wave can be cut off. The control voltage impressed upon the diaphragm electrode 55 through the circuit elements 56, 57 and 58 has the effect that the barrier diaphragm is closed at some moment within the duration of the individual rectangular pulses of the curve *s*. As a result, the duration of current flow in the load circuit during the positive half waves of current curve *i* can be enlarged and diminished by adjusting the phase shifter 56. In Fig. 12, the flow periods, i. e. the portions of the positive current half waves in which the current is effective in the circuit to be controlled, are marked by cross hatching. It will be recognized that by correspondingly displacing the curve *s* relative to curve *i* the current flow can be augmented up to the full value of the positive current half wave, and can be diminished to the zero value by a phase displacement in the opposite direction.

The series connection of a valve such as a dry rectifier with a controllable resistance unit of the type previously described thus results in controllable rectifying devices suitable for highly diversified applications similar to those heretofore served by gas-discharge devices, mercury-arc rectifiers, electronic tubes, etc. It will be obvious, therefore, that the control circuits applicable for the invention may be similar to those known from the techniques and applications of the just-mentioned other rectifying devices. In particular, many different circuits are known and suitable for providing an impulse sequence of rectangular, trapezoidal or the like wave shape similar to curve *s* in Fig. 12. For that reason, further details of the very many available circuit connections and arrangements need not here be given.

While in the above-described rectifying apparatus according to Fig. 11 the dry rectifier 53 and the series connected controllable resistance device 54 represent individual units, it is possible, and for many applications preferable, to join both devices into a single structural unit. Fig. 13 shows an embodiment of this type.

The device according to Fig. 13 involves a controllable resistance unit designed essentially in accordance with Figs. 3 and 4. In contrast, however, one of the connector electrodes, i. e. the electrode denoted in Fig. 13 by 22′ consists of a barrier-forming metal or alloy. For instance, when selenium is used as a barrier-susceptible material, the electrode 22′ may consist of a tin-cadmium alloy as used for the barrier electrode of conventional junction-type rectifier units. All other elements of the device shown in Fig. 13 are in accordance with Figs. 3 and 4 and denoted by similar respective reference numbers. In the unit according to Fig. 13, the two electrodes 22′ and 21 with the intermediate body 20 of semiconductive material may be looked upon as representing a conventional dry rectifier. By virtue of the inserted diaphragm electrode 23 with the appertaining slotted insulation 24, a barrier diaphragm is inserted into this dry rectifier. Consequently, the unit of Fig. 13 as a whole functions in a manner similar to a series arrangement of a dry rectifier and a controllable barrier type resistance device. Hence, in circuits otherwise designed in accordance with Fig. 11, the unit of Fig. 13 may be used instead of the two circuit elements denoted in Fig. 11 by 53 and 54.

The barrier layer diaphragm in a unit according to Fig. 13 may also be used not for the purpose of control in the sense of a steady or periodic control performance, but for imparting to the unit a saturation type characteristic, thus obtaining a rectifier with a saturating rectifying characteristic.

An embodiment of this type is illustrated in Fig. 14. The controllable unit as such is identical with that shown in Fig. 13 and has its elements denoted by the same respective reference numerals. However, according to Fig. 14, the two connector electrodes are attached to terminals 60 and 61 for connection to an alternating-current source or circuit. The diaphragm eletcrode 23 is connected through a short-circuit connection 62 with the connector electrode 21. The performance of this arrangement will be understood if one considers that the flow direction of a valve or rectifier is from the connector electrode to the barrier electrode. With an increasing voltage in the flow direction, the current of an ordinary dry rectifier increases continuously with the voltage although not in a linear dependence. In apparatus according to Fig. 14, the flow area of the barrier diaphragm increases continuously with an increasing voltage in the flow direction with the result that the otherwise existing dependence between current and voltage is modified in the sense of achieving a saturation characteristic.

The same effect can be achieved in the opposite, i. e. in the blocking direction of the unit if the diaphragm electrode 23 is connected, through a short-circuit connection 62, not with the electrode 21 but with the barrier-forming electrode 22. While, as a rule, a saturation characteristic in the blocking direction is not essential, such a characteristic has the advantage that minimizes any undesired back flow of current, i. e. current flowing in the blocking direction.

We claim:

1. A controllable electric resistance device, comprising a resistance body of barrier-layer-forming material forming a current path and having a spot of constricted conductance in said path, current supply means comprising a connector electrode and being conductively joined with said body to pass current through said path, and a barrier electrode joined with said body substantially around said spot and spaced from said connector electrode to permit impressing a voltage across said electrodes.

2. A controllable electric resistance device, comprising a semiconductive body forming a path for current to be controlled, two current supply terminal means joined with said body, said body having a portion of constricted cross section between said terminal means, and a barrier electrode joined with said body and fully surrounding said constricted portion.

3. A controllable electric resistance device, comprising a resistance body, conductor means joined with said body for passing current therethrough, and a barrier electrode joined with said body and forming together with said body a constricted passage for producing a barrier layer in said passage, said passage having transverse to the current flow direction of said passage a width of at most a few multiples of that of said layer.

4. An electric resistance device, comprising a resistance body of barrier-layer-forming material having a constricted portion, two mutually spaced terminal electrodes joined with said body outside of said constricted portion to pass current therethrough, a barrier electrode joined with said body at said constricted portion for producing a voltage-responsive barrier layer in said body, said barrier electrode being spaced from one of said terminal electrodes and being electrically connected with said other terminal electrode to assume a potential of given relation to that of said other terminal electrode.

5. An electric resistance device according to claim 4, comprising a short-circuit connection between said barrier electrode and said other terminal electrode whereby the device has a saturation type resistance characteristic.

6. An electric resistance device according to claim 4, comprising means for controlling the resistance characteristic of the device in both directions of current flow.

7. An electric resistance device, comprising a semiconductive body of barrier-layer-forming material, two mutually spaced terminal electrodes joined with said body to pass current therethrough, said body having two constricted portions in electric series relation to each other between said terminal electrodes, two mutually insulated barrier electrodes joined with said body at said respective constricted portions, one of said barrier electrodes being electrically joined with one of said terminal electrodes to have a correlated potential, and said other barrier electrode being electrically joined with said other terminal electrode to have a potential correlated to that of said other terminal electrode, whereby said device has voltage-responsively shaped resistance characteristics in both directions of current flow.

8. An electric resistance device, comprising two series-connected units, each unit having a semiconductive body of barrier-layer-forming material and two terminal electrodes and an intermediate barrier electrode, each of said bodies having between its two terminal electrodes a constricted portion with which the pertaining barrier electrode is joined, the barrier electrode of each unit being electrically joined with one of the appertaining terminal electrodes, and said two units being poled in opposed relation to each other, whereby said device has voltage-dependent resistance characteristics in both directions of current flow.

9. A controllable electric resistance device, comprising a semiconductive body, having two relatively large outer portions and an intermediate portion joining said two outer portions and having a constricted cross section compared with said outer portions, conductor means joined with said respective outer portions for passing current through said body, said conductor means including a connector electrode, and a diaphragm electrode adapted to form a voltage-responsive barrier layer in said body, said diaphragm electrode being spaced from said connector electrode to permit impressing a voltage across said electrodes and substantially surrounding said constricted portion in intimate contact therewith.

10. A device according to claim 9, comprising a barrier layer rectifier valve series connected with said resistance device for the rectification of current under control by said voltage.

11. In a device according to claim 9, said connector electrode consisting at its juncture with said body of barrier-forming material to form a valve together with said body, whereby the device is operable as a controllable rectifier unit.

12. A device according to claim 9, comprising barrier layer valve means electrically series related to said body and to said diaphragm electrode means and having its barrier-free side electrically connected with said diaphragm electrode means to provide a rectifying effect of a saturation characteristic in the flow direction.

13. The method of manufacturing an electric resistance device which comprises the steps of coating an unperforated barrier electrode on both sides with insulating material, perforating the insulated electrode, placing the perforated electrode onto the surface of a body portion of barrier-forming semiconductive material, placing another body portion of similar material onto said electrode and joining both portions through the perforation of the electrode.

14. A controllable electric resistance device, comprising a semiconductive body of barrier-layer-forming material having a constricted portion, a barrier electrode joined with said body at said constricted portion and substantially surrounding said constricted portion, and current supply means joined with said body to pass current through said constricted portion.

15. In a controllable electric resistance device according to claim 14, said constricted portion of said semiconductive body consisting of a filament, and said barrier electrode being joined with said filament body at a place between said contact means and fully surrounding said filament.

16. A controllable electric resistance device, comprising a flat body of semiconductive material, two connector electrodes coaxially joined with said body at opposite sides thereof and in face-to-face contact therewith, a foil shaped barrier electrode embedded in said body to produce a barrier layer, said barrier electrode extending substantially parallel to said connector electrodes and partitioning said body into two portions, said barrier electrode having at least one opening through which said body portions are joined with each other, said opening having a width in the order of a few multiples of the depth of said barrier layer.

17. A controllable electric resistance device, comprising a resistance body of barrier-layer-forming semiconductive material forming a path for current to be controlled, current supply means comprising a connector electrode and being conductively joined with said body to pass said current through said body, and a barrier electrode of flat shape traversing said resistance body and partitioning it into two portions, said barrier electrode having duct means through which said two portions are joined with each other, said barrier electrode being electrically insulated from said resistance body with the exception of the inner wall of said duct means.

18. A controllable electric resistance device, comprising a resistance body of barrier-layer-forming semiconductive material forming a path for current to be controlled, current supply means comprising a connector electrode and being conductively joined with said body to pass said current through said body, and a barrier electrode of flat shape traversing said resistance body and partitioning it into two portions, said barrier electrode having duct means through which said two portions are joined with each other, said barrier electrode being designed as a foil and having a minute foil thickness in the flow direction of said current.

EBERHARD HERMANN GEORG SPENKE.
FRANK WENZEL GEORG ROSE.
ERICH GERHARD RUDOLF WALDKÖTTER.

References Cited in the file of this patent

UNITED STATES PATENTS

| Number | Name | Date |
|---|---|---|
| 1,900,018 | Lilienfeld | Mar. 7, 1933 |
| 1,949,383 | Weber | Feb. 27, 1934 |
| 2,173,904 | Holst et al. | Sept. 26, 1939 |
| 2,208,455 | Glaser et al. | July 16, 1940 |
| 2,438,893 | Bieling | Apr. 6, 1948 |
| 2,524,033 | Bardeen | Oct. 3, 1950 |
| 2,524,034 | Brattain et al. | Oct. 3, 1950 |
| 2,524,035 | Bardeen et al. | Oct. 3, 1950 |
| 2,560,594 | Pearson | July 17, 1951 |

Notice of Adverse Decision in Interference

In Interference No. 92,297 involving Patent No. 2,648,805, E. H. G. Spenke, F. W. G. Rose and E. G. R. Waldkötter, Controllable electric resistance device, final judgment adverse to the patentees was rendered Aug. 27, 1962, as to claim 3.

[*Official Gazette October 16, 1962.*]